Feb. 2, 1965  G. KENDE  3,168,610
ZOOM LENS MOUNT
Filed May 12, 1960

United States Patent Office 3,168,610
Patented Feb. 2, 1965

3,168,610
ZOOM LENS MOUNT
George Kende, Rochester, N.Y., assignor, by mesne assignments, to Minnesota Mining and Manufacturing Company, St. Paul, Minn., a corporation of Delaware
Filed May 12, 1960, Ser. No. 28,568
2 Claims. (Cl. 88—57)

The present invention relates to a lens mount especially useful with a variable focal length or "zoom" lens suitable for a motion picture camera, although also useful in mounting other types of lenses on other types of cameras.

An object of the invention is to provide a generally improved and more satisfactory telescoping mount for a continuously variable focal length lens.

Another object is the provision of an improved mount for a zoom lens which may be adjusted continuously from one position to another without unnecessary friction and without wiggling and binding.

Still another object is to provide an improved lens mount for a zoom lens arranged so as to be adjustable continuously without undue friction while yet capable of being set in any intermediate position.

These and other desirable objectives may be attained in the manner disclosed as an illustrative embodiment of the invention in the following description and in the accompanying drawings forming a part hereof, in which:

FIG. 1 is an axial view of the lens mount according to the invention, in which is mounted a zoom lens, the upper portion of the view being a side elevation with the movable parts extended to a telephoto position, the lower portion of the view being an axial section with the movable parts retracted to a wide angle position and with the telephoto position of the movable lens components indicated in broken lines;

The same reference numerals throughout the several views indicate the same parts.

The lens mount according to the invention in its preferred embodiment is designed to mount a variable focal length or zoom lens of the type disclosed in Patent 2,925,010 of E. Turula and G. Lynch, granted February 16, 1960. The lens mount construction herein disclosed is an improvement over the lens mount referred to in the said patent of Turula and Lynch and more particularly disclosed in the copending application of George K. Czarnikow, Serial No. 850,136, filed November 2, 1959, now abandoned, and also owned by the beneficial owner of the present invention. Portions of the disclosure of the prior patent and application will be reviewed briefly insofar as pertinent to the understanding of the present construction.

Photographers, whether amateur or professional, frequently wish to be able to take pictures not only under what may be called normal lens conditions, but also under conditions making it advisable to use special lenses such as wide angle lenses or telephoto lenses. This has usually been accomplished in the past by providing separate lenses, either detachably and interchangeably mounted, or mounted on a turret. Although some efforts have been made to produce zoom lenses suitable for use on amateur cameras, such lenses have usually been so expensive that there has been little or no saving over the cost of the conventional three separate lenses. Moreover, such lenses have not been marked or graduated in a manner to facilitate adjustment to three set or standard positions corresponding, respectively, to wide angle, normal, and telephoto lenses.

The zoom lens to be mounted by the present lens mount embodies a variable focal length lens sufficiently simple and rugged to be suitable for amateur use, and which can be produced sufficiently inexpensively so that there is a real saving in cost as compared with the cost of the three conventional lenses (normal and wide angle and telephoto) which the present zoom lens replaces.

Figure 1:
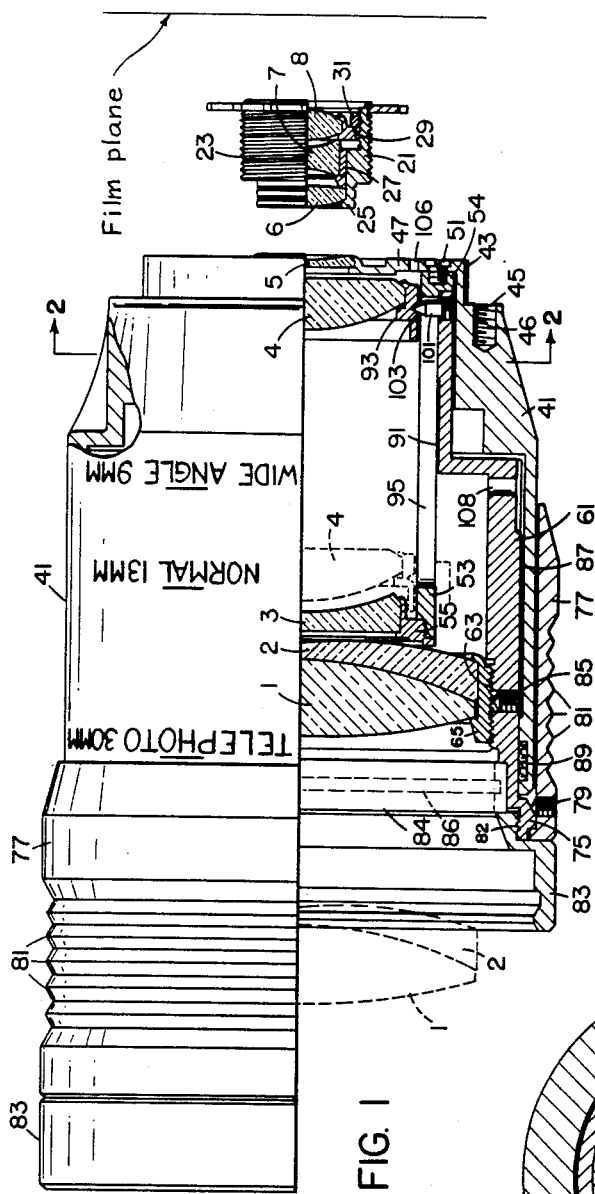

According to a preferred form of the zoom lens, the lens has eight separate lens elements numbered 1 to 8 in order from front to rear in FIG. 1. The first two lens elements constitute a cemented doublet component. The third, fourth, and fifth elements are single air spaced elements. The sixth, seventh, and eighth elements collectively may be called the rear member. This rear member in the preferred form is made up of three air spaced elements which together form a corrected photographic lens of suitable focal length, but it is within the scope of the present design to form the rear member as a simple doublet suitably designed to compensate for the aberrations of the system preceding it.

In the preferred form of the zoom lens as illustrated in FIG. 1, the front component (lenses 1 and 2) and lens 4 are axially movable to vary the magnification, and all the other lenses are stationary. In all positions of adjustment, the sum of the axial spacings between lenses 3 and 4 and lenses 4 and 5 is a constant, which obviously follows from the face that lens 4 moves axially between stationary lenses 3 and 5. Also, the axial spacing between the front component (lenses 1 and 2) and lens 3 is equal to the axial spacing between lenses 4 and 5. The preferred form of the zoom lens is designed as a universal focus lens, although the front component could be axially movable relative to lens 4, for purposes of focusing, if desired. In addition, in all positions of adjustment of the axially movable elements for variable magnification or zoming effect, the back focus remains constant.

A satisfactory location for an iris diaphragm is midway between the lens elements 5 and 6, and in such a position, the diaphragm produces a minimum of vignetting at any focal length setting. The focal length of the lens taken as a whole is continuously variable between limiting shortest and longest focal lengths. However, it is preferred to engrave or graduate the lens mount in a manner to be described to show specifically the two extreme positions and one suitable intermediate or normal focal length position, and further to indicate a wide angle and a telephoto position. The indications of the normal, wide angle, and telephoto positions of the lens are especially useful for beginners, and yet the experienced photographer may adjust the lens to an infinite variety of intermediate positions, and can also adjust it during the course of an exposure sequence, to obtain a true zoom effect.

A more detailed explanation of the optical specifications of the zoom lens is given in the aforementioned patent of Turula and Lynch, and the reader is referred there for more information.

The lens mount according to the invention for mounting the zoom lens may now be discussed. Taking up first the mounting of the three lens elements 6, 7, and 8 which collectively constitute the rear member, these elements are held in a tubular barrel 21 externally threaded at 23 and having an internal circumferential rib 25 at its forward end. The front face of the lens element 6 is held tight against the rib 25 by a sleeve 27 slidably within a smooth part of the bore of the barrel 21 and pushing forwardly against a retainer ring engaging the rear face of the lens 6. The lens 7 is within the sleeve 27 and is pressed forwardly against the retaining ring by the pressure of a mounting ring 29 which makes contact with the rear face of the lens 7 and which, in turn, is pressed forwardly by an internal nut 31 screwed into the internal threads in the barrel 21. The rearmost lens element 8 is held in a mounting ring 29. The external screw threads 23 enable the mounting barrel 21 to be screwed into the usual conventional threaded mounting opening of the camera, as usually found in the front wall of the camera or in a partition or mounting plate close to the front wall.

The other lens elements 1 through 5 are mounted in a structure which includes a main body or barrel 41 of tubular form, having at its rear end a cylindrical shoulder 43 having a smooth periphery to fit snugly into the usual lens mounting aperture in the front wall of the camera, and an annular shoulder 45 at the front end of the smooth part, which annular shoulder abuts against the front wall of the camera and thus forms the mounting surface which determines the axial position of the assembly when placed on the camera. A series of threaded holes 46, spaced circumferentially around the shoulder 45 and each extending parallel to the optical axis, receive screws inserted through the front wall or mounting plate of the camera from the rear thereof and threaded into the holes 46 to retain the mount on the camera.

At the extreme rear end of the barrel 41 formed integrally therewith, is an annular flange 47 extending radially inwardly and supporting the fixed lens 5 which may be held by a small shoulder spun into holding position over the edge of the lens.

Fixed to the flange 47, as by means of screws 51, is a stationary tube 53 concentric with the optical axis and extending forwardly in cantilever fashion. At its rear end, the tube 53 is thickened to form a shoulder 54 projecting radially outwardly as shown in the drawing. The outer peripheral edge of this shoulder constitutes a cylindrical surface accurately machined to be concentric with the main portion of the tube. This cylindrical surface on the shoulder 54 fits snugly within an internal cylindrical surface on the main tube 41 and holds the tube 53 in accurate concentric alinement with the tube or barrel 41, so that one does not have to rely on the screws 51 to establish or to maintain the concentricity. The front end of the tube 53 is internally threaded to receive a mounting ring 55 in which the lens element 3 is firmly held, as for example by spinning.

A stepped tube 61 is slidably mounted between the stationary tube 53 and the stationary barrel 41 for axial movement forwardly of and back into the annulus between these two concentric members. The two movable lens elements, that is, the front doublet consisting of the lenses 1 and 2 and the rearward lens 4, are mounted on the sliding tube 61 at a substantially fixed axial distance from one another. For mounting the front doublet, the tube 61 is internally threaded slightly to the rear of the front end at 63 to receive a mounting ring 65 in which is firmly held, as for example by spinning, the doublet component consisting of the cemented lens elements 1 and 2. The doublet is locked in place by a lock screw 85 screwed into a tapped radial aperture in the tube 61 and engaging the threaded peripheral surface of the mounting ring 65, unless the lens is of the focusing rather than the universal focus type, in which event the lock screw 85 may be omitted and the mounting ring 65 may have an arm or flange which is externally accessible for turning the ring for focusing.

The bearing engagement of the sliding tube 61 on the stationary tube 53 and the stationary barrel 41, and, more importantly, the manner of mounting the lens element 4 on the diametrically reduced rear end of the tube 61, are arranged so as to minimize sticking or seizing of the parts as the sliding action occurs. To provide a relatively short bearing for the tube 61 on the barrel 41 thereby to minimize the possibility of sticking or seizing caused by relatively long contacting sliding surfaces, the barrel 41 is undercut at 87 rearwardly of its front end.

The front end only of the barrel 41 thus bears snugly on the outside of the sliding tube 61, and is preferably provided with a packing 89 to lessen the metallic feeling of the sliding action and give a better feel as the tube 61 is moved axially. The packing 89 is slightly resilient and is received within annular recess in the front bearing surface of the barrel 41. The material of the packing 89 is desirably one which does not shrink with age or change its shape with time or temperature. Preferably the packing 89 is a hard compressed felt cemented in place within the recess in the barrel 41 extending a very slight distance above the metallic surface and sized for inside diameter. A slightly corrugated plastic nylon or "Teflon" strip may also suitably be used for the packing.

The second bearing for the sliding tube 61 is provided at the rear end of the diametrically reduced rear portion sliding on the outside of the stationary tube 53. To minimize sticking or seizing, approximately the front half of this diametrically reduced rear portion of the tube 61 is undercut at 91. This rear bearing cooperates with the front bearing on the barrel 41 previously described to effect the movement of the sliding tube 61 in an axial path while yet eliminating the added friction of long contacting surfaces.

The other movable lens element 4 is mounted, as by spinning, in a ring 93 disposed within the stationary tube 53 for axial movement. As has been mentioned, the ring 93 is mounted on the rear end of the sliding tube 61 at a substantially fixed axial distance from the front doublet consisting of the cemented lenses 1 and 2 for movement with the sliding tube 61 and the front doublet. In the aforementioned lens mount construction described in the copending Czarnikow application, the mounting ring 67 for the lens element 4 corresponding to the present ring 93 is slidable directly on the inner surface of the stationary tube 53. In accordance with the present invention, however, the ring 93 is held suspended with a circumferential clearance from the stationary tube 53 so as to eliminate this added friction. The two bearing surfaces at the rear end of the sliding tube 61 and the front end of the barrel 41 provide sufficient guidance for the sliding action.

Figure 2:
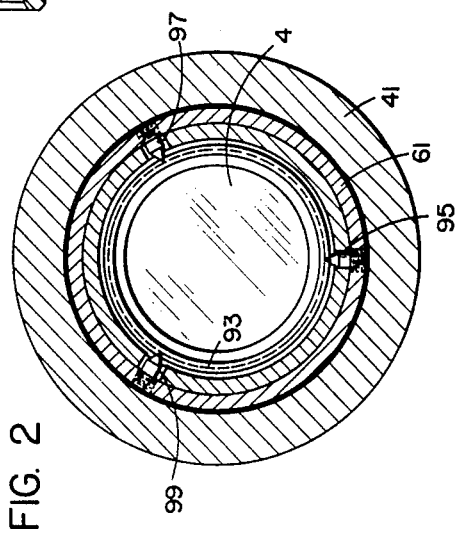
FIG. 2 is a transverse cross sectional view taken approximately on the line 2—2 of FIG. 1.

The invention provides a three point suspension for the ring 93. For this purpose, the stationary tube 53 has three equally circumferentially spaced axially extending slots 95, 97, and 99, see also FIG. 2. Three identical radial studs or screws 101 are tapped into the rear end of the sliding tube 61 and each extends through one of the slots 95, 97, and 99 to be engaged with the ring 93. Each screw 101 more specifically has a beveled or generally conical end which extends into a wedge shaped or V-shaped groove 103 extending circumferentially around the outside periphery of the ring 93. The head of each screw 101 is recessed within the sliding tube 61 so as to be out of contact with the barrel 41. The shank of each screw, furthermore, is smooth, as this portion extends through the slots 95, 97, and 99 and may have sliding contact.

Figure 3:
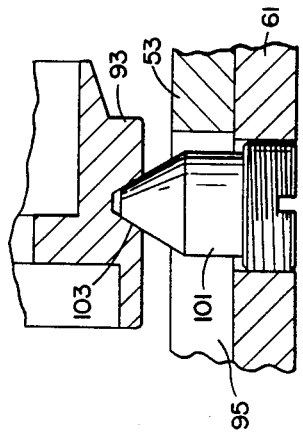
FIG. 3 is a detail sectional view taken axially on a portion of FIG. 1.

The generally conical points on the screws 101 engaging in the generally V-shaped groove 103 in the ring 93 assure that the lens element 4 is held in a fixed axial position. In practice, see FIG. 3, the groove 103 desirably has a flat bottom and the points of the conical ends of the screws 101 are removed so that the groove 103 may be relatively narrow without cutting too deeply into the ring 93. The slopes of the conical screw ends and of the groove 103 are substantially the same to provide a snug engagement. The sliding tube 61 is guided for non-rotary axial movement relative to the stationary tube 53 and the concentric barrel 41 by means of the shanks of the screws 101 passing through the axially extending slots 95, 97, and 99 in the stationary tube 53. For this reason, the screw shanks are smooth inwardly of a short threaded head section. However, in order to minimize the possibility of seizing or sticking only one screw 101 slidably engages its respective slot, while the other two slots are oversize to provide a clearance for the other two screws. Thus, the slot 95 provides a master slot for preventing relative rotation but allowing the axial movement of the sliding tube 61, while the other two slots 97 and 99 are slightly wider than the shanks of the screws 101, to provide a clearance.

Figure 4:
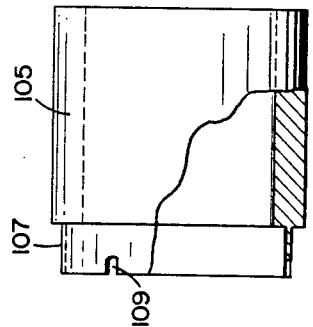
FIG. 4 is a top plan view, partially in cross section, of on alignment fixture used in assembling a portion of the lens mount.

An alinement fixture of the type shown in FIG. 4 may be used for mounting the ring 93 on the rear end of the sliding tube 61 within the stationary tube 53. The alinement fixture comprises a cylindrical holding tube 105 from which extends a thin walled sleeve 107 having three equally circumferentially spaced slots 109 to pass over the screws 101. In the sub-assembly the stationary tube 53 is first inserted into the sliding tube 61, taking care to aline the three slots in stationary tube 53 with the three tapped screw holes in sliding tube 61. Ring 93 is then inserted into the inside of thin walled sleeve 107 where it is temporarily retained by friction. Holding tube 105, containing ring 93, is then inserted within stationary tube 53, taking care to maintain the three slots 109 in approximate alinement with the screw holes in sliding tube 61. The three screws 101 are now inserted and tightened down in place with the conical end of each screw engaged in the groove 103. The thickness of the wall of the sleeve 107 corresponds to the circumferential clearance desired between the ring 93 and the stationary tube 53. When the sleeve 107 of the alining fixture is removed, the mounting ring 93 is exactly centered within the stationary tube 53 with an equal clearance at all points.

At its front end, the tube 61 is stepped to a slightly larger diameter portion 75 which receives the forward end of a sleeve 77 which surrounds the barrel 41 and is of less axial length than the barrel but of greater axial length than the maximum range of axial movement of the tube 61. The front end of the sleeve 77 is secured to the forward portion 75 of the tube 61 by screws 79. The sleeve has a series of circumferentially extending ribs or serrations 81 so that the operator's fingers may get a good grip on the sleeve to move it axially forwardly or backwardly, to adjust the equivalent focal length and thus the magnification power of the lens.

As the sleeve 77 and sliding tube 61 are moved forwardly and then backwardly in telescopic manner, it can be seen that the air spaces within the lens mount are being alternately enlarged and contracted, the moving parts acting in the nature of a pump. It is consequently desirable to provide one or more air holes through which air may escape when the mount is telescoped together, and which also serves to admit air when the mount is adjusted forwardly. To this end, the rear flange 47 of the barrel 41 has an air hole 106 inwardly of the stationary tube 53, and the sliding tube 61 has a radial air hole 108.

The lens barrel 41 is preferably graduated or marked to indicate various positions of adjustment of the sleeve 77, the indications preferably being read in conjunction with the rear edge of the sleeve. For example, the indicia "Wide Angle 9 mm." may be engraved in a circumferential direction on the cylindrical outer surface of the barrel 41, in an axial position just to the rear of the rear edge of the sleeve 77 when the latter is adjusted to its rearmost or wide angle position. In this position, the sleeve will cover and obscure all of the outer indicia on the cylindrical surface of the barrel. When the sleeve is moved forwardly to the predetermined normal lens position of adjustment, the indicia "Normal 13 mm." engraved circumferentially on the barrel will be just to the rear edge of the sleeve. Also the indicia "Telephoto 30 mm." are engraved circumferentially on the barrel in a position just to the rear of the sleeve 77 when it is adjusted to its extreme forward or telephoto position of adjustment.

On a smooth part of the periphery of the sleeve 77 itself, there may be engraved circumferentially any other desired data, such as the name or trademark of the manufacturer, or both, and the maximum aperture at which the lens will operate. In the specific example of the preferred optical specifications of the zoom lens as set forth in greater detail in the aforementioned patent, the maximum aperture is $f$:1.8 in all positions of adjustment of magnification.

The front end of the tube 61 may be internally threaded at 82 to receive a detachable and interchangeable filter retaining ring 83, to retain in place a conventional filter mounting ring 84 which has a smooth periphery to fit into a smooth counterbored part of the tube 61. The filter mounting ring 84 contains any desired filter 86.

In the operation of the lens mount according to the invention, the sleeve 77 is grasped with the tips of the fingers and moved forwardly and rearwardly with respect to the stationary barrel 41. Movement of the sleeve 77 is transmitted to the sliding tube 61 fixed to it, and to the front doublet consisting of the lens elements 1 and 2 secured to the tube 61, and also to the lens element 4 likewise secured to the tube 61 by the three point suspension mount of the invention. Friction during this sliding action has been minimized by the suspension of the mounting ring 93 for the lens element 4 within the stationary tube 53. The three equally circumferentially spaced screws 101 fixed to the rear end of the sliding tube 61 and each having a generally conical point engaged in the generally V-shaped groove 103 in the mounting ring 93 assure a clearance between the periphery of the ring 93 and the stationary tube 53. Friction is further minimized by having only one screw 101 engage the sides of a master slot 95, while the other two screws 101 extend through oversize slots 97 and 99. Engagement of the screws 101 with the front ends of the slots 95, 97, and 99 provide a forward stop for the sliding out movement of the sliding tube 61 and the attached sleeve 77. Rearward sliding movement is limited by the engagement of the rear end of the tube 61 with the radial flange 54 on the rear end of the stationary tube 53. Friction is further reduced during the sliding action by undercutting the barrel 41 at 87 and the tube 61 at 91 to provide relatively short bearing surfaces at the front end of the barrel 41 and at the rear end of the tube 61.

As the sleeve 77 and sliding tube 61 are moved out of and into the stationary tube 53 and the barrel 41, the overall magnification of the zoom lens changes continuously, and the operator may adjust the magnification to give the desired result. For the beginner, the rear edge of the sleeve 77 cooperates with the wide angle, normal, and telephoto indicia on the outside surface of the barrel 41 to give the proper magnification for these three types of shots. In FIG. 1, the lower part of the view, below the axial center line, shows the above described parts in full lines in the rearmost or wide angle position of adjustment. The lens elements 1, 2, and 4 are shown in broken lines in their forward or telephoto position of adjustment, which last mentioned position is also the position of all of the parts shown in the upper part of FIG. 1, above the axial center line.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A lens mount construction for mounting a plurality of components of a continuously variable focal length lens, the lens components including a first, a second, a third, and a fourth lens component optically alined in order from front to rear, said first and third lens components being movable while said second and fourth components are stationary, said lens mount comprising a stationary barrel having a rearmost flange in which is mounted said fourth lens component, a forwardly extending stationary tube secured to said flange, a sliding tube mounted between said stationary barrel and tube on a bearing surface at the front of said barrel and another bearing surface at the rear of said sliding tube, both of said bearing surfaces being of relatively limited axial extent and each having an axial length no greater than a relatively small fraction of the maximum axial movement of said sliding tube, said first lens component being mounted near the front of said sliding tube and said second lens component being mounted at the front of said stationary tube, a mounting ring in which said third lens component is supported, said mounting ring being disposed within said stationary tube for axial movement and having a slightly smaller diameter than that of said tube, a circumferential groove in said mounting ring, said stationary tube having three axially extending slots, and at least three radial studs fastened to the rear end of said sliding tube and each extending through one of said slots into said mounting ring groove for suspending said mounting ring at a circumferential clearance from said stationary tube, said sliding tube being movable axially forwardly and rearwardly to change the magnification of the variable focal length lens, all but one of said slots in said stationary tube being oversize with respect to the diameter of the studs passing therethrough and being normally out of engagement with their respective studs, the other stud slidably engaging its respective slot to guide the movement of said sliding tube in an axial path, the ends of said slots serving as stops to limit the sliding movement in a forward direction.

2. A lens mount construction for mounting a movable lens in such a manner as to minimize resistance to motion, said lens mount comprising a stationary barrel having a rearmost flange, a forwardly extending stationary tube mounted on said flange within said barrel, a sliding tube mounted between said stationary barrel and tube on a bearing surface of relatively short axial extent at the front of said barrel and another bearing surface of relative short axial extent at the rear of said sliding tube, a mounting ring in which said movable lens is supported, said mounting ring being disposed within said stationary tube for axial movement and having a diameter slightly smaller than that of said tube, said mounting ring having a generally V-shaped circumferential groove, said stationary tube having three circumferentially spaced and axially extending slots, and three radial screws fastened to said sliding tube and each extending through one of said slots, said screws having generally conical ends engaged snugly in said groove, thereby suspending said mounting ring at a circumferential clearance from said stationary tube for axial movement therein, the shanks of said screws which extend through said slots being smooth, two of said slots being oversize with respect to and normally out of engagement with their respective screws while the other screw slidably engages its respective slot to provide a guide for the axial movement.

References Cited by the Examiner
UNITED STATES PATENTS

| | | | |
|---|---|---|---|
| 2,461,357 | 2/49 | Broido et al. | 88—57 |
| 2,566,485 | 9/51 | Cuvillier | 88—57 |
| 2,894,430 | 7/59 | Schuch | 88—57 |
| 2,902,901 | 9/59 | Back | 88—57 |
| 2,932,237 | 4/60 | Back | 88—57 |
| 2,956,492 | 10/60 | Quick | 88—57 |

FREDERICK M. STRADER, *Primary Examiner.*

EMIL G. ANDERSON, JEWELL H. PEDERSEN,
*Examiners.*